United States Patent
Odinak et al.

(10) Patent No.: US 10,447,856 B2
(45) Date of Patent: *Oct. 15, 2019

(54) COMPUTER-IMPLEMENTED SYSTEM AND METHOD FOR FACILITATING INTERACTIONS VIA AUTOMATIC AGENT RESPONSES

(71) Applicant: Intellisist, Inc., Seattle, WA (US)

(72) Inventors: Gilad Odinak, Bellevue, WA (US); Yishay Carmiel, Seattle, WA (US)

(73) Assignee: Intellisist Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,476

(22) Filed: Nov. 26, 2018

(65) Prior Publication Data

US 2019/0098136 A1 Mar. 28, 2019

Related U.S. Application Data

(63) Continuation of application No. 15/598,984, filed on May 18, 2017, now Pat. No. 10,142,474.

(Continued)

(51) Int. Cl.
*H04M 3/51* (2006.01)
*G06F 17/27* (2006.01)
(Continued)

(52) U.S. Cl.
CPC ...... *H04M 3/5183* (2013.01); *G06F 17/2785* (2013.01); *G06Q 10/00* (2013.01); *H04L 51/02* (2013.01); *H04M 3/5166* (2013.01)

(58) Field of Classification Search
CPC ............ H04M 3/5183; H04M 3/5191; H04M 3/5166; H04M 3/523
(Continued)

(56) References Cited

U.S. PATENT DOCUMENTS 5,594,791 A * 1/1997 Szlam ................. G06Q 30/016
379/265.09
10,142,474 B2 11/2018 Odinak et al.
(Continued)

FOREIGN PATENT DOCUMENTS

| EP | 1859609 A1 | 11/2007 |
|---|---|---|
| WO | 2006102030 A1 | 9/2006 |
| WO | 2010111105 | 9/2010 |

OTHER PUBLICATIONS

Addy, Thjuan Knowlin; Office Action; U.S. Appl. No. 15/598,984; dated Apr. 2, 2018; United States Patent and Trademark Office; Alexandria, VA.

(Continued)

*Primary Examiner* — Thjuan K Addy
(74) *Attorney, Agent, or Firm* — Stevens & Showalter, L.L.P.

(57) ABSTRACT

A computer-implemented system and method for facilitating interactions via automatic agent responses is provided. A request for information for an agent is received from a user during an interaction with the agent. A list of candidate responses to the request is generated and one of the candidate responses is automatically selected when the agent fails to respond to the request within a predetermined time period. The selected response is provided to the user on behalf of the agent.

20 Claims, 2 Drawing Sheets

Related U.S. Application Data

(60) Provisional application No. 62/339,033, filed on May 19, 2016.

(51) Int. Cl.
*G06Q 10/00* (2012.01)
*H04L 12/58* (2006.01)

(58) Field of Classification Search
USPC .......... 379/265.09, 265.11, 265.05, 265.06, 379/265.08, 265.12
See application file for complete search history.

(56) References Cited

U.S. PATENT DOCUMENTS

| | | |
|---|---|---|
| 2002/0059164 A1 | 5/2002 | Stivelman |
| 2008/0256081 A1 | 10/2008 | Bui et al. |
| 2014/0307864 A1 | 10/2014 | Odinak et al. |

OTHER PUBLICATIONS

Hyam, Kristy; Examination Report; Canadian Patent Application No. 2,967,617; Mar. 19, 2018; Canadian Intellectual Property Office; Canada.

Birlescu, V.; European Search Report and Opinion; European Patent Application No. 17172010; dated Aug. 10, 2017; European Patent Office; Munich, Germany.

* cited by examiner

COMPUTER-IMPLEMENTED SYSTEM AND METHOD FOR FACILITATING INTERACTIONS VIA AUTOMATIC AGENT RESPONSES

CROSS-REFERENCE TO RELATED APPLICATIONS

This non-provisional patent application a continuation of U.S. patent application Ser. No. 15/598,984, filed May 18, 2017, pending, which claims priority under 35 U.S.C. § 119(e) to U.S. Provisional patent application Ser. No. 62/339,033, filed May 19, 2016, the disclosure of which are incorporated by reference.

FIELD

The present invention relates in general to facilitating call interactions and, in particular, to a computer-implemented system and method for facilitating interactions via automatic agent responses.

BACKGROUND

Customer call centers, or simply, "call centers," are often the first point of contact for customers seeking direct assistance from manufacturers and service vendors. Call centers are commonly reachable via voice, such as by telephone, including data network-based telephone services, or via text, such as by SMS text messaging and Instant Messaging, including live chats. However, regardless of contact medium type, keeping the customers satisfied during agent interactions remains of prime importance for retaining the business of these customers. Currently, each agent can participate in multiple interactions with different customers at a single time to reduce call wait time based on advances in technology. However, due to the multiple simultaneous interactions, an agent may not always be available to respond to a customer of one interaction in a timely manner because he must divide his time between the customers of all the current interactions. A delay in responding to a customer can cause customer dissatisfaction and frustration, which can lead to a loss of customers.

Accordingly, there is a need for reducing or eliminating delay of agent provided responses in one or more interactions simultaneously occurring. Preferably, the agent is provided with an opportunity to respond and if no response is provided, a response is automatically selected and provided to the user to prevent long delay times.

SUMMARY

A computer-implemented system and method for facilitating interactions via automatic agent responses is provided. A request for information for an agent is received from a user during an interaction with the agent. A list of candidate responses to the request is generated and one of the candidate responses is automatically selected when the agent fails to respond to the request within a predetermined time period. The selected response is provided to the user on behalf of the agent.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Call center agents are often involved in multiple interaction sessions at a time in an attempt to increase customer satisfaction by reducing wait times. Each of the interaction sessions can occur via a common medium or a different medium, including via voice, text message, or Instant Messaging. Due to participation in multiple interaction sessions, an agent may not always timely respond to one or more customers of the interaction sessions, which can result in customer dissatisfaction. To decrease any delay in response, even when the agent is busy with another customer, a list of relevant responses can be generated and one of the responses can be automatically selected and provided after a predetermined time has passed without a response from the agent.

Figure 1:
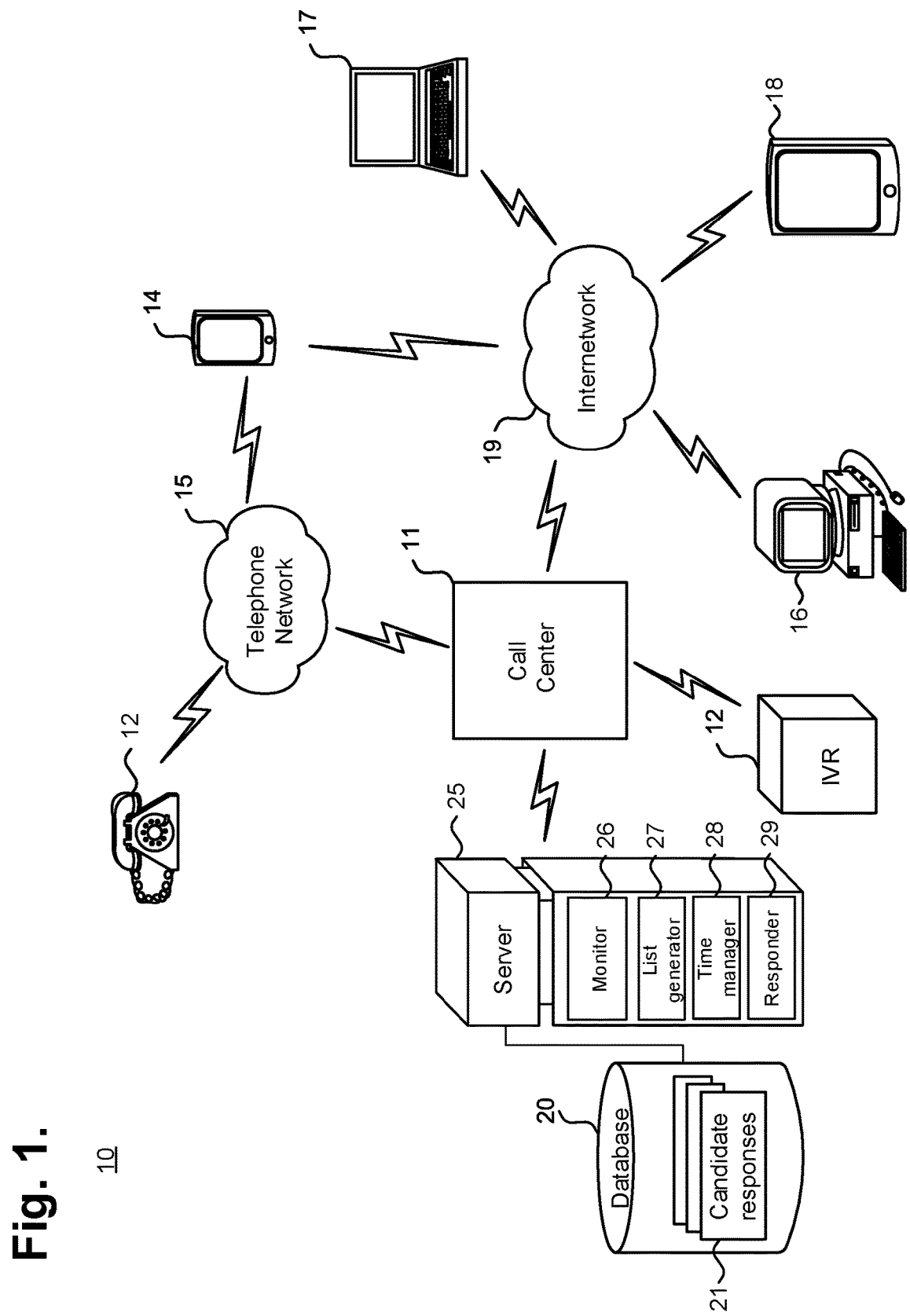
FIG. 1 is a functional block diagram showing a system for facilitating interactions via automatic agent responses, in accordance with one embodiment.

Automating agent responses reduces delay to prevent customer dissatisfaction. FIG. 1 is a functional block diagram showing a system 10 for facilitating interactions via automatic agent responses, in accordance with one embodiment. Customers wanting to correspond with a business can contact a call center 11 for that business. Hereinafter, the terms "customer" and "user" are used interchangeably with the same intended meaning, unless otherwise indicated.

The call center 11 can receive incoming calls from the customers via conventional telephone handsets 12 and portable handsets 14 through a telephone network, such as Plain Old Telephone Service (POTS) and cellular and satellite telephone service, respectively. Calls can also be received from desktop 16, portable 17 or tablet 18 computers, including VoIP clients, Internet clients and Internet telephony clients, through an internetwork 19, such as the Internet. Additionally, calls can be initiated through a Web application, such as on a smart phone 14, tablet 18, or other type of computing device. For instance, a banking application can include information regarding a user's account, including balance, debits, and deposits, as well as a call button, that automatically initiates a call between the user and a call center of the bank when pressed. In addition to calls, a customer can correspond with the call center 11 via text communication. For instance, the customer can initiate a live chat session with an agent via the Web application, which includes text communication using, for example, Instant Messaging.

In one embodiment, the incoming interaction can first be transferred to an interactive voice response (IVR) 12 that is associated with the call center 11. Specifically, the IVR can be present in the call center 11 or can be located outside of the call center 11 and accessible through the internetwork 19. If the call is initially routed to an IVR, information can be obtained from the customer regarding the interaction and used to determine which agent to assign the incoming interaction. Subsequently, the call can be transferred to an agent, either directly or via the IVR, and the agent can assist the customer and address any customer concerns. The agent can be automated or a human.

The call center 11 is associated with one or more servers 25 that can be located within the call center or remotely. The server includes a monitor 26, list generator, 27, time manager 28, and responder 29. Once the incoming interaction has been transferred to an agent, the monitor 26 monitors communication of the customer and agent to identify requests from the customer. For instance, if the customer-agent communication occurs via text messaging or Instant Messaging, text analysis can be performed on the text to identify a customer request. However, if the customer-agent communication includes voice data, such as via a telephone call, the voice data can first be transcribed and then analyzed to identify the customer request. Alternatively, the voice data itself can be analyzed to identify a request, such as by identifying trigger words or terms that indicate a request. Each customer request can include a desire or need for information, assistance, or conflict resolution. Other types of requests are possible.

Upon identifying a user request, the list generator 27 compiles a list of candidate responses 21 to the customer, for providing to the agent. The candidate responses 21 can be stored in a database 20 interconnected to the server 25. From the list, the agent can select one or more of the candidate responses for providing to the agent. Each candidate response 21 can include one or more of a predefined response, a script, a voice recording, a link, or materials, such as a user manual or other text materials. Other types of candidate responses are possible.

The time manager 28 monitors a time at which the list of candidate responses was sent to or received by the agent. If a predetermined amount of time has passed and the agent has not responded to the customer, such as by selecting one of the candidate responses for providing to the customer or by providing a different response, the responder 29 selects one of the candidate responses on the list for automatically providing to the customer.

The handsets 12, 14, computers 16-18, server 25, and IVR 12 can include one or more modules for carrying out the embodiments disclosed below. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the computing devices and server can act as a specialized computer. For instance, when the modules are implemented as hardware, that particular hardware is specialized to perform message prioritization and other computers cannot be used. Additionally, when the modules are burned into read-only memory components, the computing device or server storing the read-only memory becomes specialized to perform the message prioritization that other computers cannot. Other types of specialized computers are possible for the handsets, computers, server, and IVR for use within the call center. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
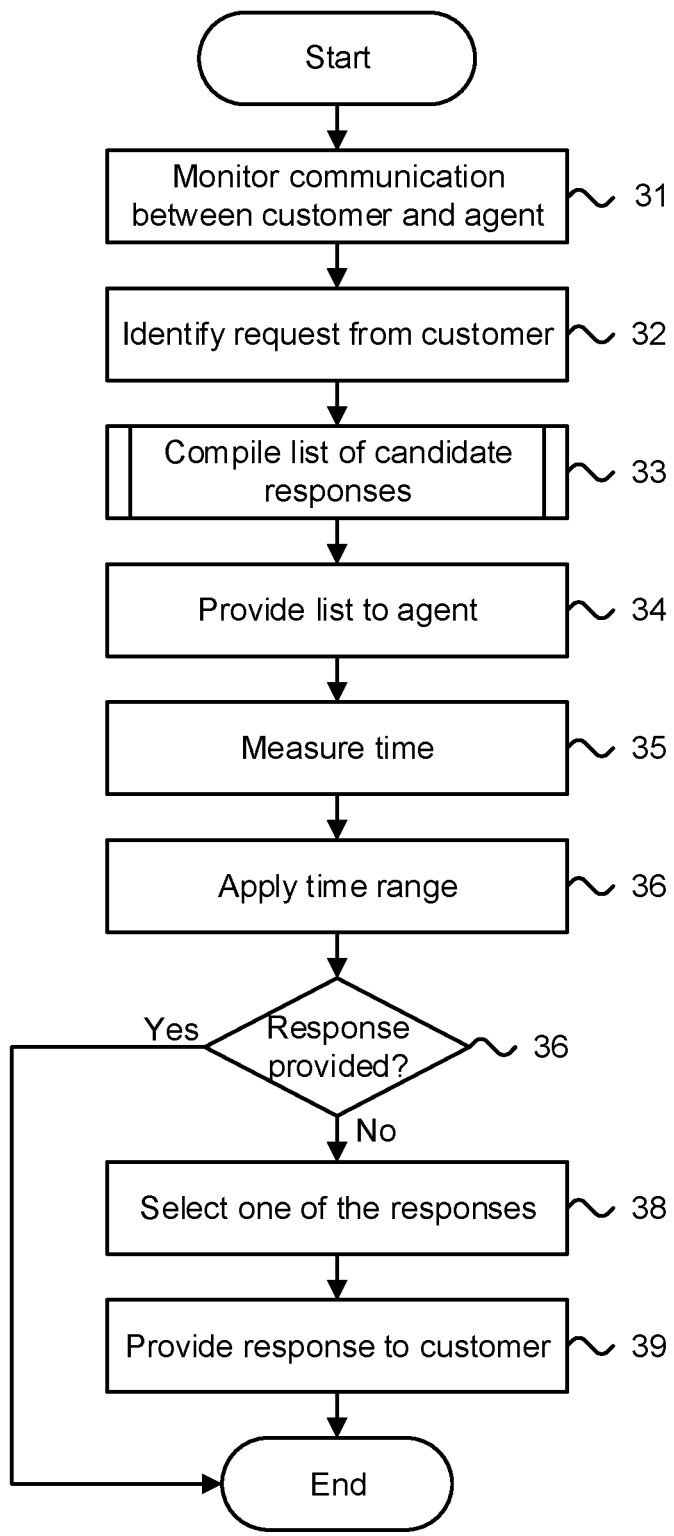
FIG. 2 is a flow diagram showing a method for facilitating interactions via automatic agent responses, in accordance with one embodiment.

Automatically providing a response helps prevent the customer from waiting too long for a response when the agent is occupied helping another customer from a concurrently pending interaction. FIG. 2 is a flow diagram showing a method 30 for facilitating interactions via automatic agent responses, in accordance with one embodiment. During an interaction, communication transmitted between a customer and an agent is monitored (block 31). The communication can occur via voice or text. One or more requests from the customer for information, assistance, or conflict resolution can be identified (block 32) based on the monitoring. For text communication, text analysis can be applied to identify the request. Alternatively, or in addition to text analysis, key words can be predetermined and used to identify the request. For voice communication, the request can be identified directly from the voice data or the voice data can first be transcribed to text for analysis as described above.

Once a request from the customer is identified (block 32), a list of candidate responses for the request is compiled (block 33). Each of the candidate responses can be selected via models or determined via machine learning based on one or more of a likelihood that each candidate response satisfies the request and a customer sentiment regarding that candidate response. For example, the likelihood of satisfaction can be measured based on previous interactions during which the candidate response was provided in response to the same or related request of the customer, including a number of times the candidate response was provided to the agent and particular replies from the customer. For instance, if the customer provides the same request after receiving a response, the response likely failed to adequately address the customer's request. Additionally, the likelihood of satisfaction for each candidate response can be based on responses directly provided by the agent during previous interactions. Those candidate responses that are associated with a higher likelihood of satisfaction are more likely to be selected for inclusion on the list.

Further, with regards to sentiment analysis, text analysis is performed to identify a reaction or attitude of the customer with respect to a particular response. For instance, a response is provided to a customer, either from a list of candidate response or directly from the agent, and a sentiment of the customer can be determined based on the next reply received from the customer or the next few replies. The sentiment expressed can be positive, negative, or neutral with respect to the response provided by the agent. Thus, if the sentiment is low, or negative, for a candidate response to a particular request, that candidate response is less likely to be selected for inclusion in the list for a request similar to the particular request.

A customer's attitude or reaction to a response can also be measured directly, such as in response to a request from the agent or call center. For instance, a verbal "whisper," such as a verbal message that the customer, but not the agent, can hear can be provided to the customer to obtain the customer's reaction to the response. The customer can respond by pressing a button or a combination of buttons, such as ##0, on a touchtone phone when dissatisfied with the response. Similarly, during an interaction occurring via an online chat, the customer can select an appropriate button to indicate a sentiment regarding the response.

In one embodiment, only a single measure, such as likelihood of request satisfaction or sentiment, is used to select candidate responses. However, in a further embodiment, a combination of the measures can be used.

Once the list of candidate responses is compiled (block 33), the list is provided (block 34) to the agent for selecting one or more of the candidate responses for providing to the customer. Time is measured (block 35) either upon delivery of the list to the agent or upon receipt of the list by the agent. Also, a predetermined amount of time is applied (block 36) to the measured time. If the measured time exceeds the predetermined amount of time and the agent has not provided a response to the customer, a candidate response is automatically selected (block 38) from the list and provided to the customer on behalf of the agent. However, if the agent selects and provide a candidate response from the list, or directly provides a response to the customer when the measured time is less than the predetermined time, no further action is performed.

The candidate response can be automatically selected based on a single measure, such as likelihood of request satisfaction or sentiment, or on multiple measures. For instance, the candidate response with the highest sentiment value or the highest likelihood of request satisfaction can be selected; however, other measures or methods for selecting a candidate response are possible. In a further embodiment, the measures can be weighted when a combination of measures is utilized to select the candidate response for providing to the customer. For instance, the likelihood of request satisfaction measure can be weighted 40%, while the sentiment value can be weighted 60%, to determine a final score for determining which candidate request to select for providing to the customer.

Automatically providing a response to a customer is beneficial to prevent customer dissatisfaction, obtain additional information from the customer, and provide additional time for the agent to attend to the customer. In one example, the agent assigned to multiple interactions may be entering credit card information for one customer and unable to provide a response to another customer's request. To prevent the requesting customer from becoming frustrated or upset due to a lack of response, one of the candidate responses is automatically selected and provided to the customer on behalf of the agent. In such a scenario, the customer may be unaware the response was not directly provided by the agent.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for facilitating interactions via automatic agent responses, comprising:
    a database to store candidate responses; and
    a server comprising a central processing unit, memory, an input port to receive the candidate responses from the database, and an output port, wherein the central processing unit is configured to:
        receive for an agent a request for information from a user during an interaction with the agent;
        generate a list of at least a portion of the candidate responses to the request;
        automatically select one of the candidate responses when the agent fails to respond to the request within a predetermined time period; and
        provide the selected response to the user on behalf of the agent.

2. A system according to claim 1, wherein the central processing unit monitors an interaction between the agent and at least one other user while the candidate response is selected and provided to the user.

3. A system according to claim 1, wherein the central processing unit identifies the request comprising receiving from the user communication comprising one or more of speech, voice recordings, text messages and Instant Messages during the interaction, and identifying within the communication from the user trigger words that indicate the request.

4. A system according to claim 1, wherein the central processing unit identifies a further request from the user during the interaction, obtains a list of further candidate responses to the request, sends the list of further candidate responses to the agent, receives a selection of one of the candidate responses from the list via the agent, and provides the selected candidate response from the agent to the user.

5. A system according to claim 1, wherein the central processing unit selects the candidate responses on the list based on a likelihood that each candidate response satisfies the request comprising measuring the likelihood that each candidate response satisfies the request and identifying those candidate responses with a higher likelihood measure as the selected candidate responses for inclusion on the list.

6. A system according to claim 1, wherein the central processing unit selects the candidate responses on the list based on a sentiment of the user with respect to prior related responses provided to the user.

7. A system according to claim 6, wherein the central processing unit obtains the sentiment of the user with respect to at least one of the prior related responses via a verbal message provided to the customer during a prior interaction with the agent or a different agent, wherein the verbal message is heard only by the user.

8. A system according to claim 7, wherein the central processing unit receives the sentiment from the user via a button or a combination of buttons on a telephone.

9. A system according to claim 1, wherein the central processing unit selects the candidate responses based on a likelihood that each candidate response satisfies the request and a sentiment of the user with respect to prior related responses provided to the user.

10. A system according to claim 1, wherein the candidate responses each comprise one of a predetermined response, script, voice recording, link, text, and manual.

11. A computer-implemented method for facilitating interactions via automatic agent responses, comprising:
    receiving for an agent a request for information from a user during an interaction with the agent;
    generating a list of candidate responses to the request;
    automatically selecting one of the candidate responses when the agent fails to respond to the request within a predetermined time period; and
    providing the selected response to the user on behalf of the agent.

12. A method according to claim 11, further comprising:
    monitoring an interaction between the agent and at least one other user while the candidate response is selected and provided to the user.

13. A method according to claim 11, further comprising:
    identifying the request comprising:
        receiving from the user communication comprising one or more of speech, voice recordings, text messages, and Instant Messages during the interaction; and
        identifying within the communication from the user trigger words that indicate the request.

14. A method according to claim 13, further comprising:
    identifying a further request from the user during the interaction;
    obtaining a list of further candidate responses to the request;
    sending the list of further candidate responses to the agent;

receiving a selection of one of the candidate responses from the list via the agent; and providing the selected candidate response from the agent to the user.

15. A method according to claim 11, further comprising:

selecting the candidate responses based on a likelihood that each candidate response satisfies the request, comprising:

measuring the likelihood that each candidate response satisfies the request; and identifying those candidate responses with a higher likelihood measure as the selected candidate responses for inclusion on the list.

16. A method according to claim 11, further comprising:

selecting the candidate responses based on a sentiment of the user with respect to prior related responses provided to the user.

17. A method according to claim 16, further comprising:

obtaining the sentiment of the user with respect to at least one of the prior related responses via a verbal message provided to the customer during a prior interaction with the agent or a different agent, wherein the verbal message is heard only by the user.

18. A method according to claim 17, further comprising:

receiving the sentiment from the user via a button or a combination of buttons on a telephone.

19. A method according to claim 11, further comprising:

selecting the candidate responses based on a likelihood that each candidate response satisfies the request and a sentiment of the user with respect to prior related responses provided to the user.

20. A method according to claim 11, wherein the candidate responses each comprise one of a predetermined response, script, voice recording, link, text, and manual.

* * * * *